United States Patent
Manion et al.

(10) Patent No.: US 7,660,851 B2
(45) Date of Patent: Feb. 9, 2010

(54) MEETINGS NEAR ME

(75) Inventors: Todd R. Manion, Redmond, WA (US); Sandeep K. Singhal, Kirkland, WA (US); Eliot Flannery, Redmond, WA (US); Aaron Cunningham, Redmond, WA (US); Ravi Rao, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 144 days.

(21) Appl. No.: 11/175,937

(22) Filed: Jul. 6, 2005

(65) Prior Publication Data

US 2007/0011233 A1    Jan. 11, 2007

(51) Int. Cl.
G06F 15/16 (2006.01)
G06F 3/00 (2006.01)

(52) U.S. Cl. .................................... 709/204; 715/753

(58) Field of Classification Search .............. 709/204; 348/14.08; 715/751–758
See application file for complete search history.

(56) References Cited

U.S. PATENT DOCUMENTS

| | | | |
|---|---|---|---|
| 5,854,898 A | 12/1998 | Riddle | |
| 5,917,480 A | 6/1999 | Tafoya et al. | |
| 5,987,376 A | 11/1999 | Olson et al. | |
| 6,078,948 A | 6/2000 | Podgorny et al. | |
| 6,108,687 A | 8/2000 | Craig | |
| 6,155,840 A | 12/2000 | Sallette | |
| 6,163,809 A | 12/2000 | Buckley | |
| 6,216,110 B1 | 4/2001 | Silverberg | |
| 6,237,025 B1 | 5/2001 | Ludwig et al. | |
| 6,363,352 B1 | 3/2002 | Dailey et al. | |
| 6,463,460 B1 * | 10/2002 | Simonoff | 709/203 |
| 6,526,411 B1 | 2/2003 | Ward | |
| 6,557,027 B1 * | 4/2003 | Cragun | 709/204 |
| 6,636,889 B1 | 10/2003 | Estrada et al. | |
| 6,658,568 B1 | 12/2003 | Ginter et al. | |

(Continued)

FOREIGN PATENT DOCUMENTS

GB    2378268    2/2003

(Continued)

OTHER PUBLICATIONS

"At What Cost Pervasive? A Social Computing View of Mobile Computing Systems," IBM Research: vol. 38, No. 4, 1999, Pervasive Computing (28 pgs.).

(Continued)

*Primary Examiner*—Larry D Donaghue
(74) *Attorney, Agent, or Firm*—Marshall, Gerstein & Borun LLP

(57) ABSTRACT

A method for creating, discovering, and joining meetings over a peer-to-peer network involves creation of a graph of meetings on a local subnet. When a meeting is created a meeting record is added to the graph where it may be discovered by other potential meeting attendees. A user may select from a list of meetings displayed in a meeting management window and send requested showing the selected meaning. Credentials, such as a password, may be supplied with the request. When the request is validated, information is sent to the requester for use in joining the meeting. When an ad hoc wireless session is used to hold a meeting the discovery process may further include analyzing data traffic to determine which wireless sessions are meetings.

5 Claims, 7 Drawing Sheets

U.S. PATENT DOCUMENTS

| | | | |
|---|---|---|---|
| 6,675,205 | B2 | 1/2004 | Meadway et al. |
| 6,701,344 | B1 | 3/2004 | Holt et al. |
| 6,714,966 | B1 | 3/2004 | Holt et al. |
| 6,728,753 | B1 | 4/2004 | Parasnis et al. |
| 6,745,178 | B1 | 6/2004 | Emens et al. |
| 6,748,421 | B1 * | 6/2004 | Ozkan et al. ............... 709/206 |
| 6,791,582 | B2 | 9/2004 | Linsey et al. |
| 6,801,604 | B2 | 10/2004 | Maes et al. |
| 6,968,179 | B1 | 11/2005 | De Vries |
| 6,973,618 | B2 * | 12/2005 | Shaughnessy et al. ....... 715/239 |
| 6,981,223 | B2 * | 12/2005 | Becker et al. ............... 715/753 |
| 6,996,076 | B1 * | 2/2006 | Forbes et al. ................ 370/310 |
| 7,043,529 | B1 * | 5/2006 | Simonoff .................... 709/205 |
| 7,062,532 | B1 * | 6/2006 | Sweat et al. ................ 709/205 |
| 7,065,579 | B2 * | 6/2006 | Traversat et al. ............ 709/230 |
| 7,254,608 | B2 * | 8/2007 | Yeager et al. ............... 709/203 |
| 7,277,946 | B2 * | 10/2007 | Humphrey et al. .......... 709/226 |
| 2001/0035976 | A1 | 11/2001 | Poon |
| 2001/0053213 | A1 | 12/2001 | Truong et al. |
| 2002/0073204 | A1 | 6/2002 | Dutta et al. |
| 2002/0097267 | A1 | 7/2002 | Dinan et al. |
| 2002/0133611 | A1 * | 9/2002 | Gorsuch et al. ............. 709/231 |
| 2002/0140730 | A1 | 10/2002 | Linsey et al. |
| 2002/0143989 | A1 | 10/2002 | Huitema et al. |
| 2002/0154172 | A1 | 10/2002 | Linsey et al. |
| 2002/0184311 | A1 * | 12/2002 | Traversat et al. ............ 709/204 |
| 2002/0184358 | A1 | 12/2002 | Traversat et al. |
| 2003/0009565 | A1 * | 1/2003 | Arao ........................... 709/227 |
| 2003/0014485 | A1 | 1/2003 | Banatwala |
| 2003/0036941 | A1 | 2/2003 | Leska et al. |
| 2003/0055892 | A1 | 3/2003 | Huitema et al. |
| 2003/0088544 | A1 | 5/2003 | Kan et al. |
| 2003/0126027 | A1 | 7/2003 | Nelson et al. |
| 2003/0135629 | A1 | 7/2003 | Sasaki et al. |
| 2003/0217073 | A1 | 11/2003 | Walther et al. |
| 2004/0078436 | A1 | 4/2004 | Demsky et al. |
| 2004/0082351 | A1 | 4/2004 | Westman |
| 2004/0088325 | A1 | 5/2004 | Elder et al. |
| 2004/0107256 | A1 * | 6/2004 | Odenwald et al. ........... 709/205 |
| 2004/0111423 | A1 | 6/2004 | Irving et al. |
| 2004/0117446 | A1 | 6/2004 | Swanson |
| 2004/0122898 | A1 | 6/2004 | Srinivasa |
| 2004/0122901 | A1 | 6/2004 | Sylvain |
| 2004/0128350 | A1 | 7/2004 | Topfl et al. |
| 2004/0141005 | A1 | 7/2004 | Banatwala et al. |
| 2004/0143603 | A1 | 7/2004 | Kaufmann et al. |
| 2004/0172455 | A1 | 9/2004 | Green et al. |
| 2004/0172456 | A1 | 9/2004 | Green et al. |
| 2004/0184445 | A1 | 9/2004 | Burne |
| 2004/0249970 | A1 | 12/2004 | Castro et al. |
| 2004/0260771 | A1 | 12/2004 | Gusler et al. |
| 2005/0009537 | A1 | 1/2005 | Crocker et al. |
| 2005/0027805 | A1 | 2/2005 | Aoki |
| 2005/0038856 | A1 | 2/2005 | Krishnasamy et al. |
| 2005/0066001 | A1 | 3/2005 | Benco et al. |
| 2005/0080859 | A1 | 4/2005 | Lake |
| 2005/0102245 | A1 | 5/2005 | Edlund et al. |
| 2005/0102356 | A1 | 5/2005 | Manion et al. |
| 2005/0171799 | A1 | 8/2005 | Hull et al. |
| 2005/0198173 | A1 | 9/2005 | Evans |
| 2005/0235038 | A1 | 10/2005 | Donatella et al. |
| 2007/0165629 | A1 * | 7/2007 | Chaturvedi et al. ......... 370/389 |

FOREIGN PATENT DOCUMENTS

| | | |
|---|---|---|
| WO | WO-0120450 | 3/2001 |
| WO | WO-200409550 A1 | 7/2004 |

OTHER PUBLICATIONS

"Connecting and Extending Peer-to-Peer Networks," Lion Share White Paper, dated Oct. 2004, 32 pages, http://lionshare.its.psu.edu/main/info/docspresentation/LionshareWP.pdf.

"Design Explorations," IBM Research: Social Computing Group (4 pgs.).

"IBM Lotus Instant Messaging and Web Conferencing," IBM Software—IBM Lotus Instant Messaging and Web Conferencing home page (3 pgs.).

"Presence and Awareness Services," Ramiro Liscano, Professor, SITE, University of Ottawa, 89 pages, http://www.site.uottawa.ca/-rliscano/tutorials/PresenceAwarenessServices.pdf.

"Publication Related to Pastry," http://research.microsoft.com/~antr/Pastry/pubs.htm.

The Gnutella Protocol Specification v0.4, http://www.clip2.com.

About Presentation Broadcasting, 3 pages printed Jul. 1, 2005 from http://office.microsoft.com/en-us/assistance/HP052411931033.aspx.

Bouvin, "Designing User Interfaces for Collaborative Web-Based Open Hypermedia," in Proceedings of the Eleventh ACM Conference on Hypertext and Hypermedia, pp. 230-231 (San Antonio, TX, 2000).

Boyer et al., "Virtual Social Clubs: Meeeting Places for the Internet Community," IEEE International Conference on Multimedia Computing and Systems, pp. 297-301 (Florence, Italy, Jun. 7-11, 1999).

Castro et al., "Secure Routing For Structured Peer-to-Peer Overlay Networks," Usenix, OSDI '02 Paper (OSDI '02 Tech Program Index) pp. 299-314 of the Proceedings, Fifth Symposium on Operating Systems Design and Implementation (OSDI 2002) 33 pages, http://www.usenix.org/events/osdi02/tech/full_papers/castro/castro_html/.

Castro et al., "Topology-Aware Routing In Structured Peer-to-Peer Overlay Networks," Technical Report MSR-TR-2002-82, Microsoft Research, Microsoft Corporation http://www.research.microsoft.com.

Cheng et al., "Hutchworld: Lessons Learned. A Collaborative Project: Fred Hutchinson Cancer Research Center & Microsoft Research," in Proceedings of Second International Conference on Virtual Worlds (VW 2000), pp. 1-2 (Paris, France, Jul. 5-7, 2000). http://research.microsoft.com/scg/papers/hutchvw2000.pdf.

Cheung, "Chatopus for Palm OS, Using IM Bots for Jabber," Chatopus-Palm OS Instant Messaging Client for XMPP/Jabber, Dated Oct. 20, 2002 (Last updated: Jun. 25, 2005), 6 pages, http://www.chatopus.com/articles/bots.html.

Cugola et al., "Peer to Peer for Collaborative Applications," in Proceedings of the 22nd International Conference on Distributed Computing Systems Workshops (ICDCS'02), pp. 359-364 (Vienna, Austria, Jul. 2-5, 2002).

Dabek, F., et al.,Building Peer-to-Peer Systems With Chord, a Distributed Lookup Service, at MIT Laboratory for Computer Science, 6 pages, at http://pdos.lcs.mit.edu/chord.

Dorohonceanu et al., "A Desktop Design for Synchronous Collaboration," in Proceedings of the Graphics Interface '99 (GI'99), pp. 27-35 (Kingston, Ontario, Canada, Jun. 1999).

Druschel, P., et al., PAST: A large-scale, persistent peer-to-peer storage utility, at Rice University and Microsoft Research, 6 pages.

Duhr, "Oberflachenelemente in interaktiven und kooperativen anwendungen," Universitat Oldenburg, Department of Information Systems Thesis (Aug. 2000).

Ellison, C., et al., Simple Public Key Certificate, (Internet Draft 1999), at http://www.world.std.com/~cme/spki.txt (Aug. 6, 2001).

Ellison, C., et al., SPKI Certificate Theory, (The Internet Society 1999), at http://www.ietf.org/rfc/rfc2693.txt?number=2693 (Aug. 6, 2001).

Ellison, C., SPKI Requirements, (The Internet Society 1999), at http://www.ietf.org/rfc/rfc2692.txt?number=2692 (Aug. 6, 2001).

Erdelsky, P., The Birthday Paradox, EFG, at http://www.efgh.com/math/birthday.htm (Mar. 8, 2002).

Famham et al., "Supporting Sociability in a Shared Browser," in Proceedings of Interact Conference (Tokyo, Japan, Jul. 2001) http://research.microsoft.com/scg/papers/sharedbrowsinginteract.pdf, pp. 1-8.

Garcia et al., "Extending a Collaborative Architecture to Support Emotional Awareness," EBAA '99—Workshop on Emotion-Based Agent Architectures, pp. 46-52 (May 2, 1999).

Greenberg et al, "Using a Room Metaphor to Ease Transitions in Groupware," University of Calgary, Department of Computer Science, Research Report 98/611/02, 31 pages (1998).

Greenberg, "Collaborative Interfaces for the Web, " in Human Factors and Web Development, (Forsythe et al., eds.) Chapter 18, pp. 241-253, LEA Press, (1997).

Gutwin, "Workspace Awareness in Real-Time Distributed Groupware," The University of Calgary, Department of Computer Science, Ph.D. Thesis, 270 pages (Dec. 1997).

Handley et al., "SIP: Session Initiation Protocol," Network Working Group, Request for Comments 2543, pp. 1-153 (Mar. 1999).

Kindberg, "Mushroom: A Framework for Collaboration and Interaction Across the Internet," in Proceedings of the Fifth ERCIM Workshop on CSCW and the Web (St. Augustin, Germany, Feb. 1996).

Kollock et al., "Managing the Virtual Commons: Cooperation and Conflict in Computer Communities," in Computer-Mediated Communication: Llinguistic, Social, and Cross-Cultural Perspectives, (Herring, ed.), pp. 109-128 (John Benjamins, Amsterdam, Netherlands, 1996) http://research.microsoft.com/scg/papers/KollockCommons.htm.

Kollock, "The Economies of Online Cooperation: Gifts and Public Goods in Cyberspace," in Communities in Cyberspace, (Smith et al, eds.), pp. 1-17 (Routledge, London, UK, 1999) http://www.sscnet.ucla.edu/soc/faculty/kollock/papers/economies.htm.

Lai, K. et al., Measuring Link Bandwidths Using a Deterministic Model of Packet Delay, at Department of Computer Science at Stanford University, 13 pages.

Langley, A., The Freenet Protocol, The Free Network Project, at http://freenet.sourceforge.net/index/php?page=protocol (May 21, 2001).

Lee et al., "Supporting Multi-User, Multi-Applet Workspaces in CBE," in Proceedings of the ACM 1996 Conference on Computer Supported Cooperative Work, pp. 344-353 (Cambridge, MA, 1996).

QuickTime Broadcaster (3 pages) printed Jul. 1, 2005 from http://www.apple.com/quicktime/broadcaster/.

Red-Black Tree, National Institute of Standards and Technology, at http://www.nist.gov/dads/HTML/redblack.html (Mar. 5, 2002).

Rowstron et al., Pastry: Scalable, distributed object location and routing for large-scale peer-to-peer systems, at Microsoft Research, Ltd., St. George House and Rice University, 20 pages.

Rowstron et al., SCRIBE: The design of a large-scale event notification infrastructure, at Microsoft Research, Ltd., St. George House and Rice University, 20 pages.

Rowstron et al., Storage management and caching in PAST, a large-scale, persistent peer-to-peer storage utility, at Microsoft Research, Ltd., St. George House and Rice University, 14 pages.

Schmidt et al., "A Generic System for Web-Based Group Interaction," in Proceedings of the Thirty-First Hawaii International Conference on System Sciences, vol. I, pp. 545-554 (Kohala Coast, HI, Jan. 6-9, 1998).

SlidesNow! (3 pages) printed Jul. 1, 2005 from http://www.slidesnow.com/about.shtml.

Smith et al., "The Social Life of Small Graphical Chat Spaces," in Proceedings of the SIGCHI Conference on Human Factors in Computing Systems, pp. 462-469 (The Hague, Netherlands, Mar. 2000) http://research.microsoft.com/scg/papers/vchatchi2000.pdf.

Smith et al., "What Do People Do in Virtual Worlds? An Analysis of V-Chat Log File Data," Microsoft Corporation Report (Apr. 1, 1998) http://research.microsoft.com/scg/papers/kollockvpchat.pdf.

The Best Way to Centrally Deploy Applications and Provide On-Demand Access, 2 pages printed Jul. 1, 2005 from http://www.citrix.com/English/ps2/products/product.asp? contentID=186.

Tyson, "How the Old Napster Worked," http://computer.howstuffworks.com/napster.htm/printable.

Zhao, et al., "A Web Based Multi-Display Presentation System," 2 pages printed Jul. 1, 2005 from http://www.fxpal.com/publications/FXPAL-PR-04-303.pdf.

"IBM Workplace Collaboration Services Overview Guide" dated Jan. 2005, 2 pages. (Printed from ftp://ftp.lotus.com/pub/lotusweb/IGM_Workplace_collaboration_services_g224733301_118.pdf on Jul. 1, 2005).

MeetingMaker—WebEvent Publish printout, 2 pages printed on Jul. 1, 2005 from http://www.meetingmaker.com/products/webevent_publish/default.cfm.

MeetingMaker—Meeting Maker printout, 2 pages printed on Jul. 1, 2005 from http://www.meetingmaker.com/products/meetingmaker/default.cfm.

* cited by examiner

MEETINGS NEAR ME

BACKGROUND

There have been many attempts to facilitate computer-based meetings, for example, Microsoft NetMeeting allows a meeting organizer to invite and admit attendees. Microsoft Live Meeting uses a conferencing server to join meeting attendees together. Apple Rendezvous and game lobbies allow finding people using a multicast protocol.

SUMMARY

Meetings on a peer-to-peer network are facilitated by publishing a meeting record for each meeting active on that subnet; this meeting record may be published directly by individual meeting participants, or it may be published into a distributed datastore. Meeting attendees may perform queries to receive a list of meetings and associated information. The information available may include the meeting organizer, start time and duration, and an Internet protocol address for an associated instance of a meeting organizer application. A potential attendee may select a meeting and send a request to join a meeting, including a password if required, to the IP address listed. When any criteria are met, such as password validation, an invitation may be returned to the requesting party. Invitation may include data required to join the meeting on the peer-to-peer network.

In the case of ad hoc network sessions supported on wireless networks, a list of each visible wireless session may be captured. Data corresponding to each visible wireless session may be evaluated to determine which sessions are meetings. Once a wireless session is determined to be a meeting, a user may join using the standard flow discussed above.

DETAILED DESCRIPTION

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts in accordance to the present invention, further discussion of such software and ICs, if any, will be limited to the essentials with respect to the principles and concepts of the preferred embodiments.

Figure 1:
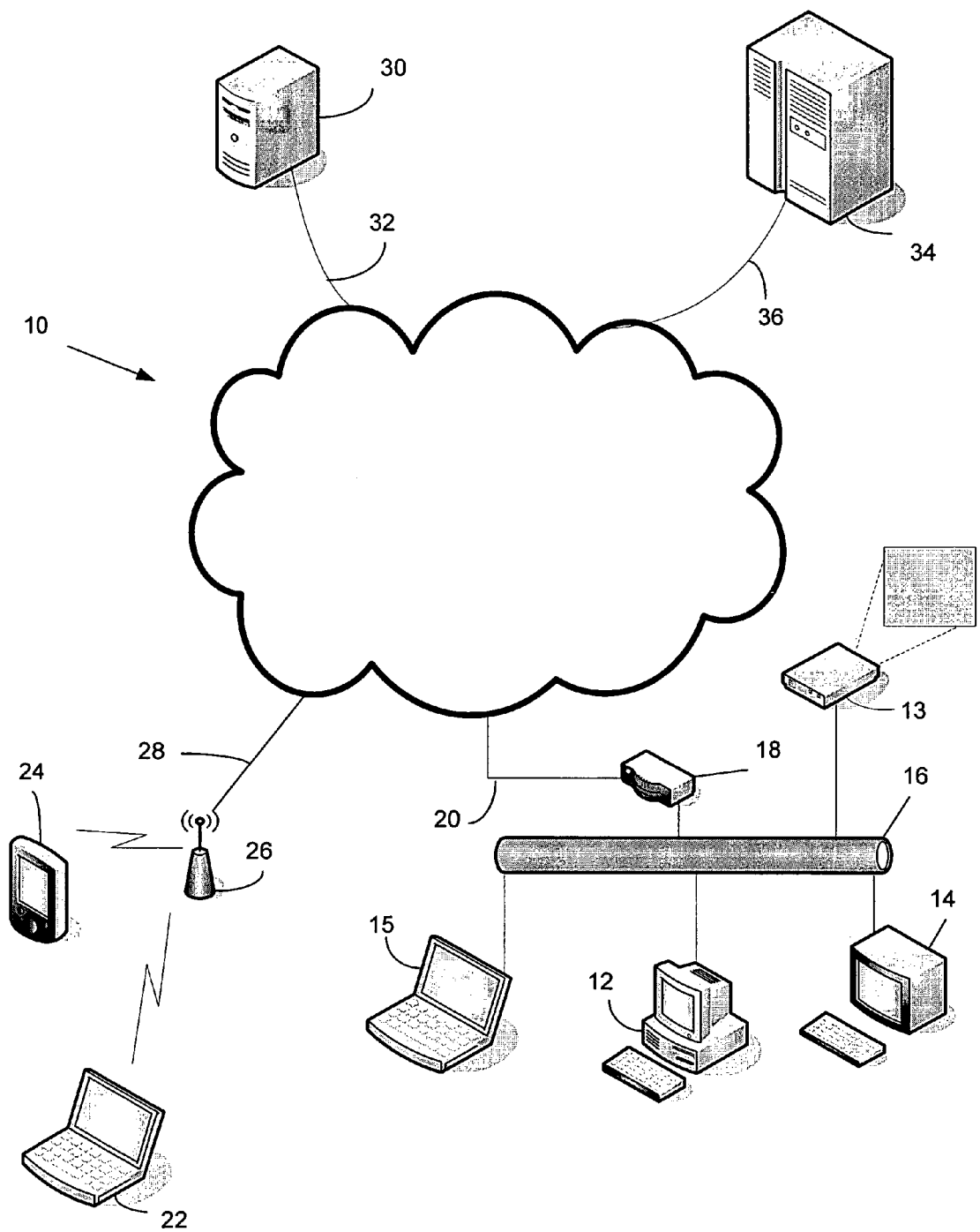
FIG. 1 is a simplified and representative block diagram of a computer network.
Figure 2:
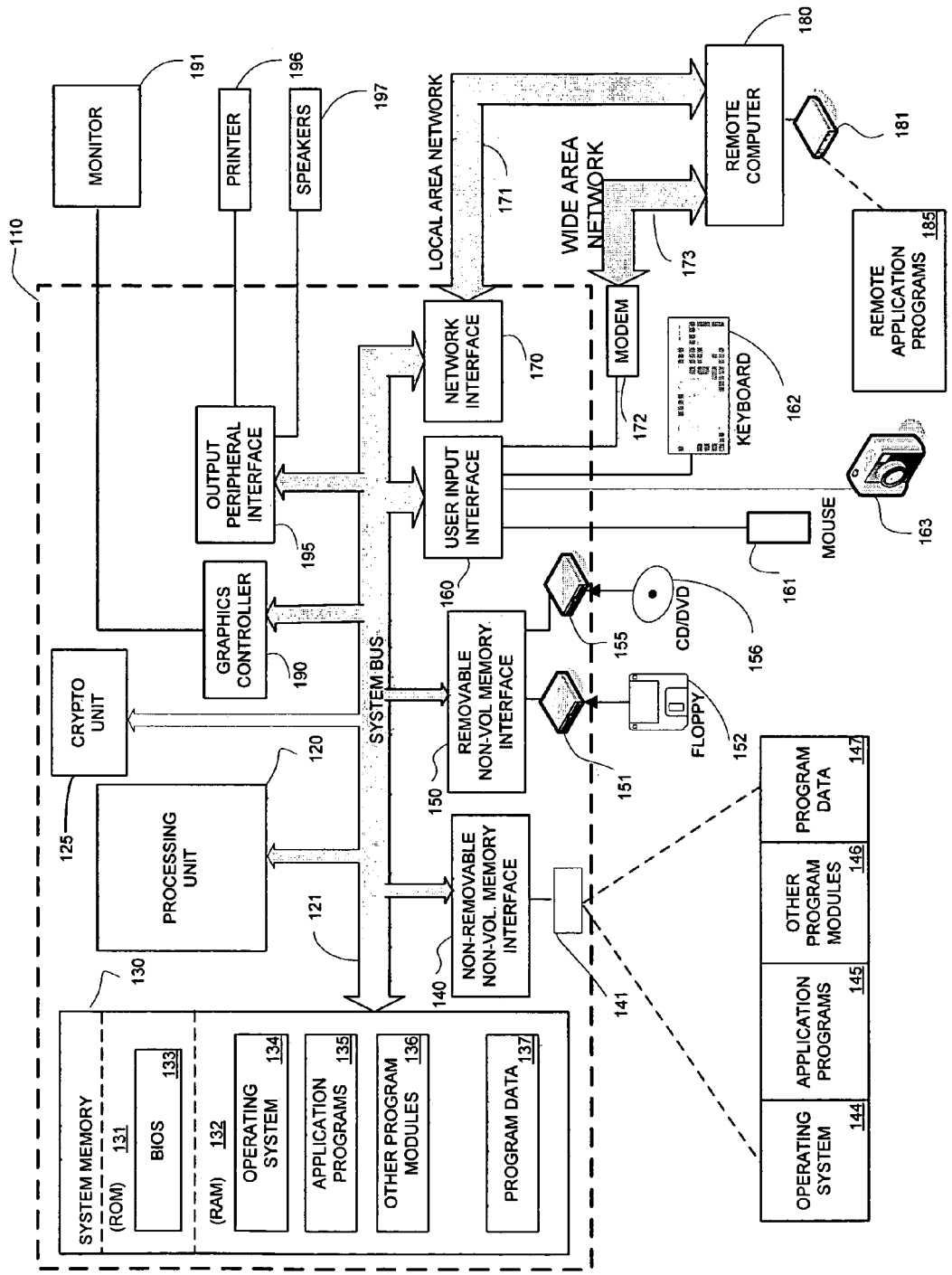
FIG. 2 is a block diagram of a computer that may be connected to the network of FIG. 1.

FIGS. 1 and 2 provide a structural basis for the network and computational platforms related to the instant disclosure.

FIG. 1 illustrates a network 10 that may be used to implement a dynamic software provisioning system. The network 10 may be the Internet, a virtual private network (VPN), or any other network that allows one or more computers, communication devices, databases, etc., to be communicatively connected to each other. The network 10 may be connected to a personal computer 12, a computer terminal 14, and a laptop 15 via an Ethernet 16 and a router 18, and a landline 20. The Ethernet 16 may be a subnet of a larger Internet Protocol network. Other networked resources, such as a projector 13, may also be supported via the Ethernet 16 or another data network. On the other hand, the network 10 may be wirelessly connected to a laptop computer 22 and a personal data assistant 24 via a wireless communication station 26 and a wireless link 28. Similarly, a server 30 may be connected to the network 10 using a communication link 32 and a mainframe 34 may be connected to the network 10 using another communication link 36. The network 10 may be useful for supporting peer-to-peer network traffic.

FIG. 2 illustrates a computing device in the form of a computer 110. Components of the computer 110 may include, but are not limited to a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 may also include a cryptographic unit 125. Briefly, the cryptographic unit 125 has a calculation function that may be used to verify digital signatures, calculate hashes, digitally sign hash values, and encrypt or decrypt data. The cryptographic unit 125 may also have a protected memory for storing keys and other secret data. In addition, the cryptographic unit 125 may include an RNG (random number generator) which is used to provide random numbers. In other embodiments, the functions of the cryptographic unit may be instantiated in software or firmware and may run via the operating system or on a device.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134 application programs 135, other program modules 136, and program data 137.

The computer 110 may also include other removable/non-removable, volatile/nonvolatile computer storage media. By way of example only, FIG. 2 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2, provide storage of computer readable instructions, data structures, program modules and other data for the computer 110. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and cursor control device 161, commonly referred to as a mouse, trackball or touch pad. A camera 163, such as web camera (webcam), may capture and input pictures of an environment associated with the computer 110, such as providing pictures of users. The webcam 163 may capture pictures on demand, for example, when instructed by a user, or may take pictures periodically under the control of the computer 110. Other input devices (not shown) may include a microphone, joystick, game pad, satellite dish, scanner, or the like. These and other input devices are often connected to the processing unit 120 through an input interface 160 that is coupled to the system bus, but may be connected by other interface and bus structures, such as a parallel port, game port or a universal serial bus (USB). A monitor 191 or other type of display device is also connected to the system bus 121 via an interface, such as a graphics controller 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 2. The logical connections depicted in FIG. 2 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the input interface 160, or other appropriate mechanism. In a networked environment, program modules depicted relative to the computer 110, or portions thereof, may be stored in the remote memory storage device. By way of example, and not limitation, FIG. 2 illustrates remote application programs 185 as residing on memory device 181.

The communications connections 170 172 allow the device to communicate with other devices. The communications connections 170 172 are an example of communication media. The communication media typically embodies computer readable instructions, data structures, program modules or other data in a modulated data signal such as a carrier wave or other transport mechanism and includes any information delivery media. A "modulated data signal" may be a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Computer readable media may include both storage media and communication media.

Figure 3:
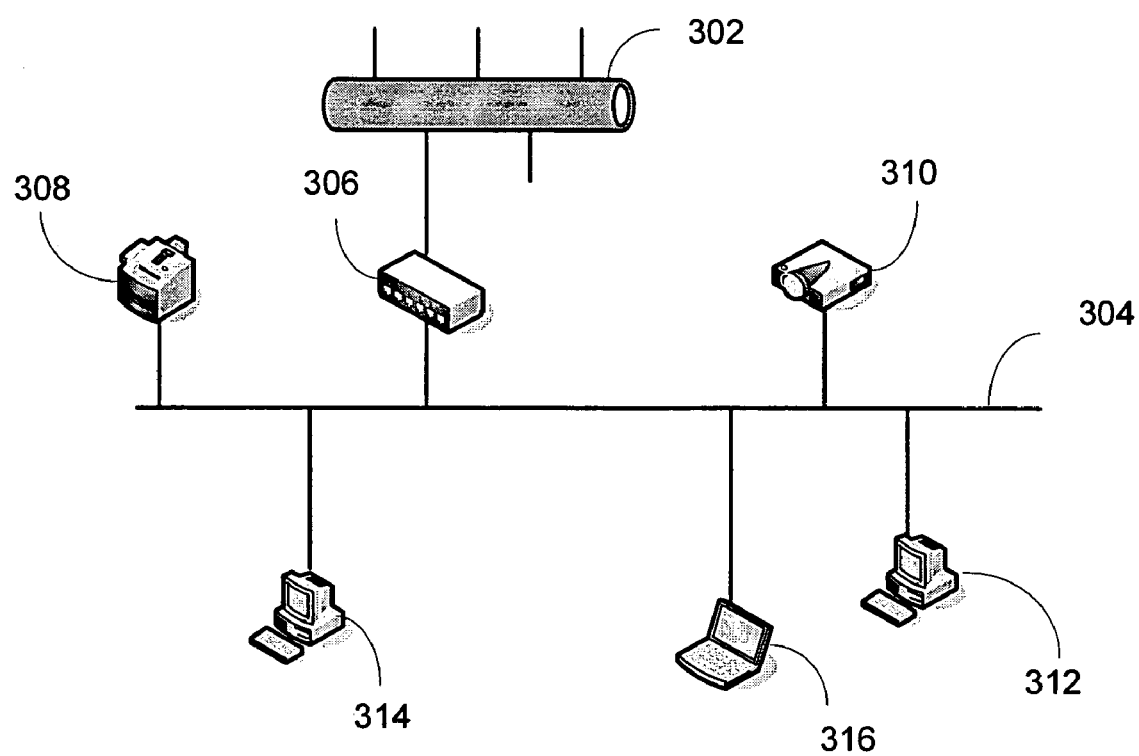
FIG. 3 is a representation of a of a subnet of a computer network such as that of FIG. 1.

FIG. 3 depicts an exemplary computer network, that may be similar to or coupled to the network 10 of FIG. 1. A data network 302, for example an Ethernet network, may have a subnet 304 coupled to the data network 302 by a bridge or router 306. Network devices may be coupled to the subnet 304. In this exemplary illustration, a printer 308 and a network aware projector 310 are present on the subnet 304. Workstations or computers 312 314 and laptop 316 are also present on the subnet 304.

Figure 4:
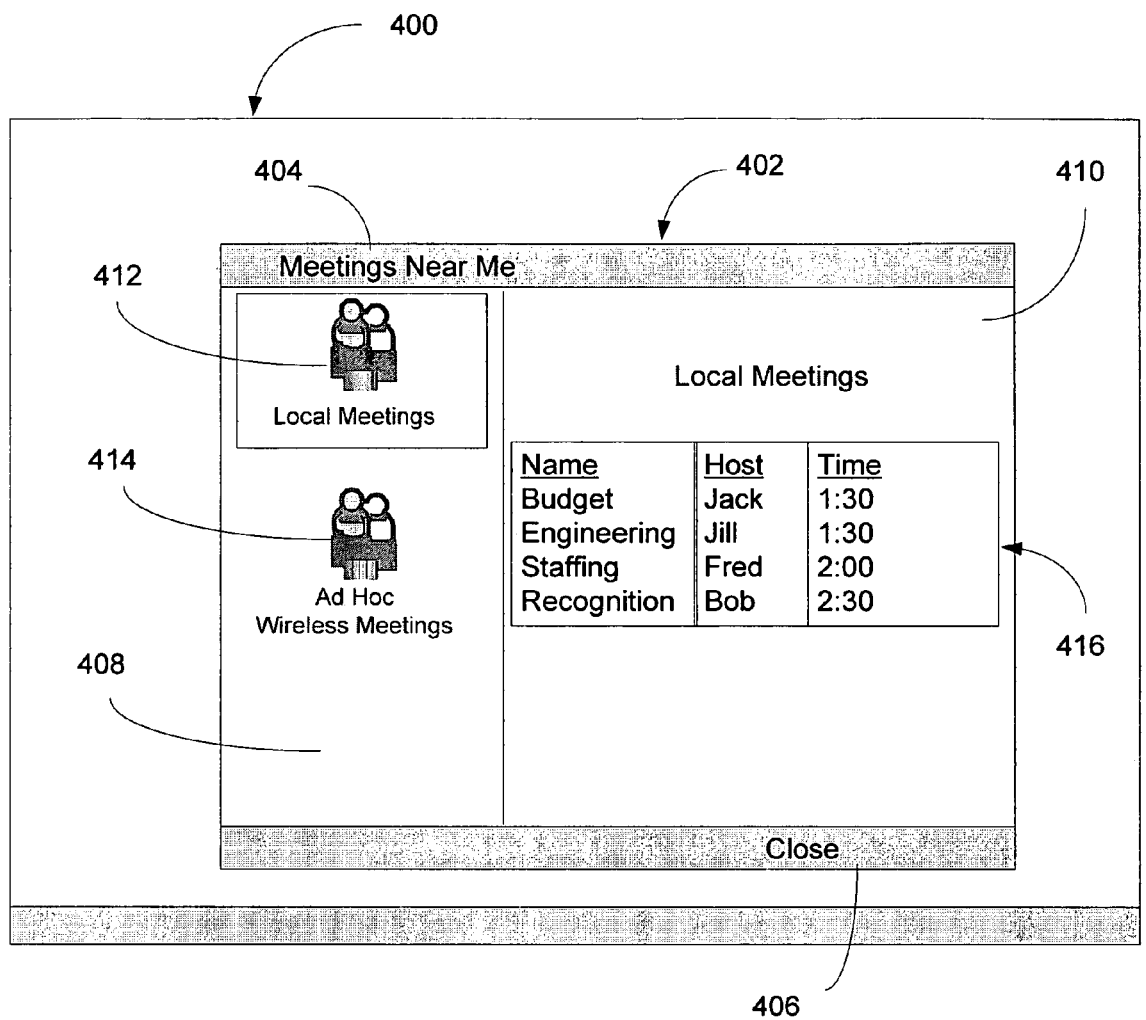
FIG. 4 is a representation of a computer display showing a meeting management window.

FIG. 4 depicts the computer display 400, and a window 402. The window 402 includes a title bar 400, a status bar 406, a first pane 408 for displaying network-level meeting information, and a second pane 410 for displaying meeting information. The first pane 408 may display icons related to available networks. For example, an icon 412 may represent meetings on a local subnet such as subnet 304. A second icon 414 may represent meetings taking place on an ad hoc wireless network. As shown in this embodiment, with the first icon 412 selected a sub-pane 416 may display information about current meetings, such as the four shown.

Figure 5:
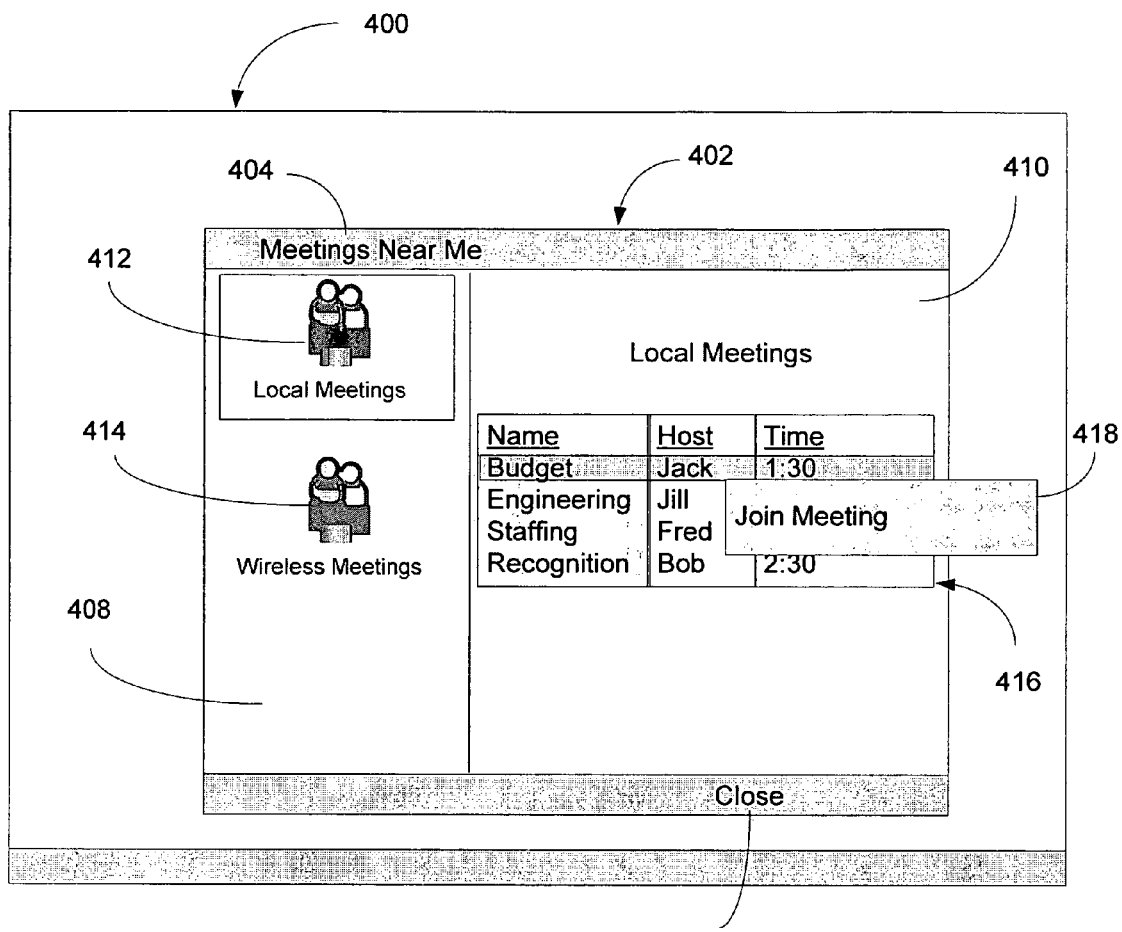
FIG. 5 is a representation of a computer display showing the meeting management window of FIG. 4 with a meeting selected.

FIG. 5 depicts the computer display 400 of FIG. 4 showing an exemplary embodiment giving the result of a right-click on the budget meeting shown in sub-pane 416. A pop-up 418 indicates the user may join the meeting by selecting the pop-up menu item 418 labeled "Join Meeting."

Figure 6:
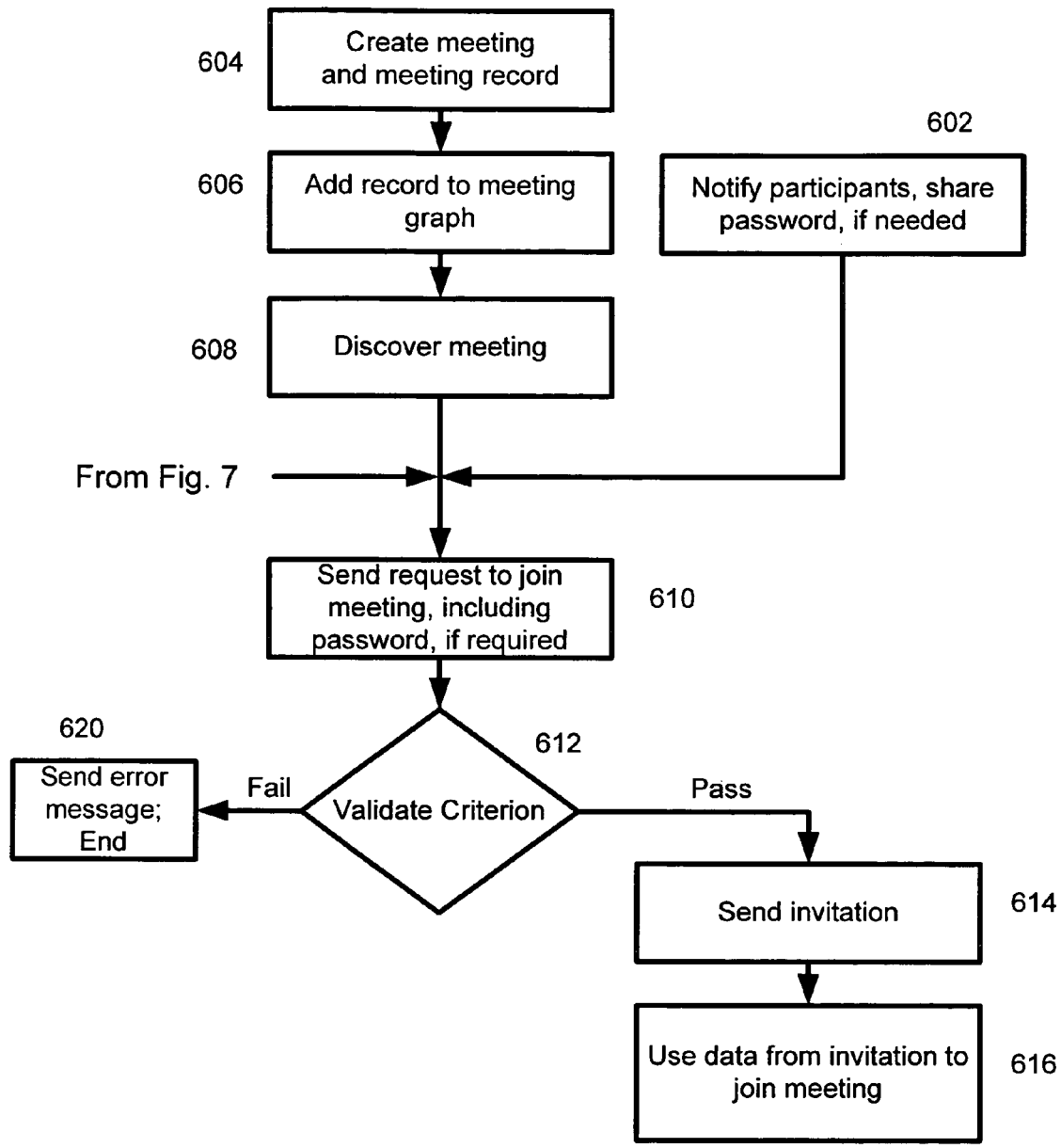
FIG. 6 is a method of starting, discovering, and joining a meeting.

FIG. 6 as a method of holding an online meeting, such as may be performed by a computer 110 using computer executable instructions stored on a computer-readable medium such as disk drive 140 of FIG. 2. In the illustrated exemplary embodiment, a meeting organizer may notify recipients 602 about a meeting. If password access is to be required a password may be provided as well. The notifications 602 and optional password may be distributed by e-mail, instant message, posting on a bulletin board, verbally, etc. To maintain the effectiveness of the password, the password may typically be distributed out-of-band compared to data traffic discussed below associated with joining users to a meeting in progress. Note that in some cases, for example, standing meetings, a specific invitation may not be sent at all.

Before, after, or contemporaneously with notifying recipients 602 of the meeting, a meeting may be created 604 by a meeting organizer, a meeting leader, or a meeting attendee by activating an instance of a meeting organizer application. A corresponding meeting record may also be created 604 for publication, as discussed in more detail below. While the illustrated embodiment shows a meeting invitations being sent out for the creation of the meeting, in another embodiment the meeting may actually be started before any invitations are sent 602.

The meeting record may include information about the meeting, such as a meeting organizer, a title, an image associated with the meeting, a start time and duration, and an Internet Protocol (IP) address of an instance the meeting organizer application, a meeting attendee, or PeerName, such as that defined by the Windows™ P2P Grouping protocol. The meeting record may also include, instead of or supplemental to an IP address, a network endpoint, such as an IP address and port number or a hostname with either an implicit or explicit port number. The network endpoint may identify multiple instances of the meeting organizer application or multiple meeting attendees. The meeting record is then published 606 so that it is available to other hosts on the subnet. The meeting organizer application may search for an existing meeting discovery graph (distributed datastore) scoped to the local peer-to-peer subnet, such as subnet 304 of FIG. 3. When found, the meeting record may be added to the graph where it may be discovered by a known method, such as a network explorer or database query. The meeting graph may contain other records corresponding to additional meetings currently active on the local subnet. When no existing meeting graph is found, a new graph maybe instantiated in the meeting record added to the newly created graph. Alternatively, the meeting record can be published by using a broadcast or multicast discovery protocol on the local subnet. Upon receiving broadcast or multicast queries for meeting records, the host responds with the meeting record(s) that it has available. Such broadcast or multicast discovery protocols are well known in the prior art and include Simple Subnet Discovery Protocol (SSDP), Web Services Discovery (WSD), and Service Location Protocol (SLP).

Publishing the meeting record, either via the meeting graph or through a discovery protocol, serves to advertise the meeting to the surrounding computers on the peer-to-peer subnet. By using a discovery mechanism such as a network explorer or a local instance of a meeting application, a user or attendee may discover 608 the meeting records and learn about those meetings currently in process. For example, refer to meeting window 402, sub-pane 416 of FIG. 4.

As discussed with respect to FIG. 5, the attendee may select a meeting and request 610 to join the meeting. The attendee may be asked for a meeting password, which is discussed above, may have been supplied out-of-band. In other embodiments, a password may not be required, for example, a group wide meeting, a training class, or a streaming data feed. The request to join the meeting may be forwarded to the IP address or network endpoint included in the meeting record. The request may be examined by the meeting organizer application to determine whether to honor the request to join the meeting. The examination may include validation 612 of a password, hash of a password, or other criteria included in the request. When the password or hash matches the expected value the pass branch of block 612 may be followed and an invitation to the meeting may be forwarded 614 to the attendee requesting admission to the meeting. Data from the invitation, such as terminal services connection information or peer-to-peer streaming service identifiers may be used to connect 616 to the meeting. The invitation may be signed by the meeting organizer application to protect its contents from modification and signal to other meeting participants that the recipient has been duly authorized to participate in the meeting. Because the attendee requesting admission was on the local subnet, discovered the meeting, and supplied a valid password, if required, he or she may be admitted to the meeting without any further interaction from the meeting organizer. This reduces the burden on the meeting organizer as well as minimizes interruptions caused by late arriving attendees. When, at block 612, the validation fails an error message may be sent 620 to the attendee requesting access.

Figure 7:
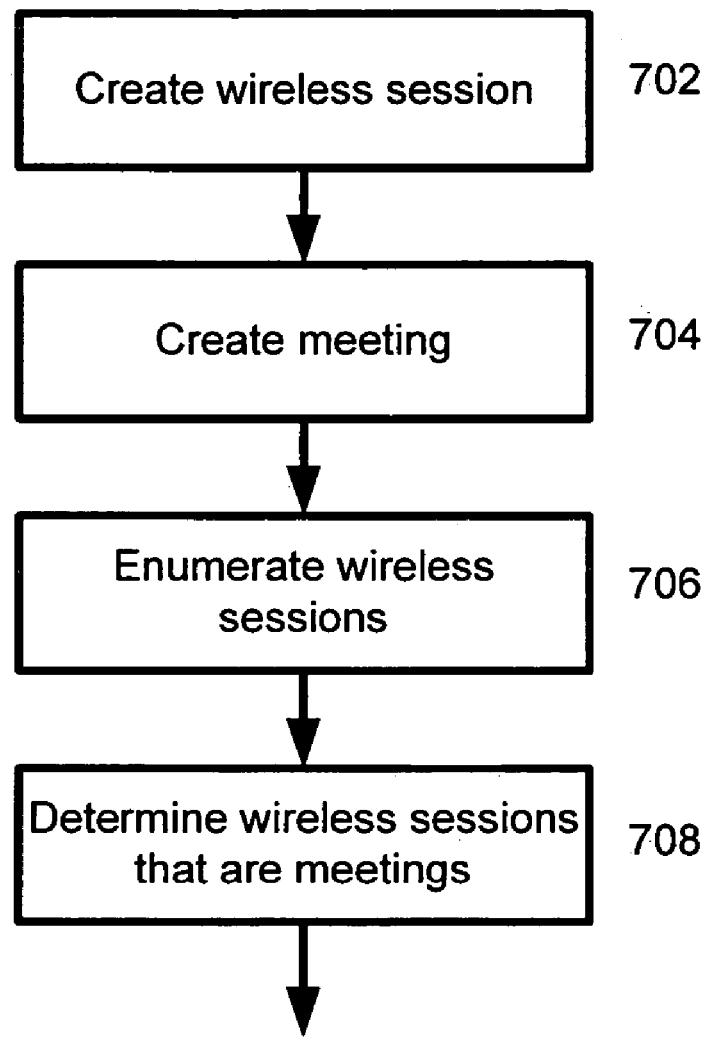
FIG. 7 is the continuation of the method of FIG. 6 when wireless sessions are present.

FIG. 7 expands the method of FIG. 6 when local wireless, or ad hoc wireless sessions, are used to hold meetings. The use of wireless networks has become commonplace. Many of the wireless devices used by computers for networking have the ability to "talk" to each other directly without the use of a wireless access point. To illustrate, a number of meeting attendees may be co-located but still wish to share files or view a common presentation, even though no wireless infrastructure is available. The attendees may form a local (ad hoc) wireless network for the purpose of sharing data in the course of holding their meeting. A first attendees may create 702 a wireless session and then create 704 a meeting, using a process similar to that described above. A person wishing to join the meeting may enumerate 706 all the wireless sessions visible at that location.

By scanning each of the enumerated wireless sessions it may be possible to determine 708 which wireless sessions contain active meetings. For example, an information element provided in the wireless session advertisement may include a meeting record or list of those users known to be in the meeting. Alternatively, data traffic broadcast on the wireless network might contain a meeting record or list of those users known to be in the meeting. In another embodiment, inspection of the data traffic associated with a wireless session may include that associated with a meeting, such as a specific wireless information element or appended special characters indicative of a meeting. Referring briefly back to FIG. 4, by selecting wireless meeting icon 414, the user may see those wireless sessions that have been determined to be hosting meetings. The person wishing to join such a meeting may, after attaching to the associated wireless network, continue the joining process from block 610 of FIG. 6, that is, request access and supply credentials as required.

The process discussed above allows users of a peer-to-peer network to create, discover, and join meetings easily and with a minimum of burden on the meeting organizer, or leader, and a minimum of intrusiveness to those already engaged in a meeting.

Although the forgoing text sets forth a detailed description of numerous different embodiments of the invention, it should be understood that the scope of the invention is defined by the words of the claims set forth at the end of this patent. The detailed description is to be construed as exemplary only and does not describe every possibly embodiment of the invention because describing every possible embodiment would be impractical, if not impossible. Numerous alternative embodiments could be implemented, using either current technology or technology developed after the filing date of this patent, which would still fall within the scope of the claims defining the invention.

Thus, many modifications and variations may be made in the techniques and structures described and illustrated herein without departing from the spirit and scope of the present invention. Accordingly, it should be understood that the methods and apparatus described herein are illustrative only and are not limiting upon the scope of the invention.

We claim:

1. A method of adding attendees to a meeting held over a peer-to-peer network comprising:
    starting the meeting;
    creating a meeting record corresponding to the meeting after starting the meeting;
    sending the meeting record to at least one of a meeting graph of a subnet or a discovery protocol, the meeting record comprising at least one of an Internet protocol address or network endpoint;
    enumerating current wireless sessions;
    monitoring data traffic associated with each enumerated wireless session;
    determining which of the enumerated wireless sessions represent online meetings; and
    obtaining a meeting record from data published in each of the enumerated wireless sessions determined to be a meeting;
    receiving a request to join the meeting from a requesting party, the request comprising data from the meeting record; and
    sending an invitation to the requesting party when the request to join the meeting meets a criterion.

2. A computer adapted for a operation in a peer-to-peer network, the computer comprising:
    a processing unit for executing instructions;
    a networking device coupled to processing unit for coupling data transmitted between the computer and a network; and
    a memory for storing computer executable instructions, coupled to the processing unit, the computer executable instructions for executing a method comprising:
    discovering records corresponding to meetings on a peer-to-peer subnet cataloging observable wireless sessions, wherein monitoring data from each of the observable wireless sessions comprises:
        determining which of the observable wireless sessions are meetings; and
        obtaining the meeting record from data published in at least one of the observable wireless sessions determined to be a meeting;
    reading the records;
    displaying information corresponding to the meetings;
    receiving a selection of one the meetings;
    sending a request to join the one of the meetings; and
    joining the meeting when the request is approved.

3. The method of claim 1, further comprising joining the requested party to the meeting via a meeting organizer application instance.

4. The method claim 1, further comprising:
    sending a password and an invitation for the meeting to a meeting invitee, wherein receiving the request to join the meeting further comprises receiving the password and the criterion comprises validation of the password.

5. The method of claim 1, further comprising displaying meeting information for at least one of the meeting record or each additional meeting record.

* * * * *